(12) United States Patent
Jackson et al.

(10) Patent No.: US 10,374,663 B2
(45) Date of Patent: Aug. 6, 2019

(54) DIGITAL DITHERING FOR REDUCTION OF QUANTIZATION ERRORS AND SIDE-LOBE LEVELS IN PHASED ARRAY ANTENNAS

(71) Applicant: Hughes Network Systems, LLC, Germantown, MD (US)

(72) Inventors: Thomas Jackson, Germantown, MD (US); Hamad Alsawaha, Germantown, MD (US); Bingqian Lu, Germantown, MD (US); Peter Hou, Germantown, MD (US); Yilin Mao, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 15/396,070

(22) Filed: Dec. 30, 2016

(65) Prior Publication Data
US 2018/0191406 A1    Jul. 5, 2018

(51) Int. Cl.
| *H04B 7/01* | (2006.01) |
| *H04B 7/185* | (2006.01) |
| *H01Q 21/22* | (2006.01) |
| *H01Q 3/26* | (2006.01) |
| *H01Q 3/38* | (2006.01) |

(52) U.S. Cl.
CPC .................. *H04B 7/01* (2013.01); *H01Q 3/26* (2013.01); *H01Q 3/38* (2013.01); *H01Q 21/22* (2013.01); *H04B 7/18528* (2013.01)

(58) Field of Classification Search
CPC ............ H01Q 3/24; H01Q 3/38; H01Q 3/267; H01Q 3/30; H01Q 3/26; H01Q 21/22; H04B 7/01; H04B 7/084; H01P 1/397; H01P 1/18; H03H 11/20; H03H 7/20
See application file for complete search history.

(56) References Cited

U.S. PATENT DOCUMENTS

| 5,063,529 A | * | 11/1991 | Chapoton | .............. H01Q 3/267 342/174 |
| 5,103,232 A | | 4/1992 | Chang | |
| 5,937,006 A | * | 8/1999 | Clark | ..................... G01R 27/32 324/601 |
| 6,266,010 B1 | | 7/2001 | Ammar | |
| 6,518,917 B1 | * | 2/2003 | Durfee | .................... G01S 7/282 342/159 |

(Continued)

OTHER PUBLICATIONS

Daniel Thompson, MarkYeary, Caleb Fulton, and Blake McGuire, Optimized Beam Steering Approach for Improved Sidelobes in Phased Array Radars Using a Minimal Number of Control Bits, University of Oklahoma, IEEE Transactions on Antennas and Propagation, Jan. 2015.*

(Continued)

*Primary Examiner* — Aristocratis Fotakis
(74) *Attorney, Agent, or Firm* — Sheppard, Mullin, Richter & Hampton LLP

(57) ABSTRACT

Systems and methods disclosed herein provide techniques for reducing quantization errors and side lobe levels in phased array antennas. The states of a quantized phase shifter of a phased array antenna may be dithered to achieve a time-averaged value that reduces quantization errors. By rapidly switching between the different states of the quantized phase shifter, a time-average value close to a desired phase state may be achieved with a low resolution phase shifter.

21 Claims, 9 Drawing Sheets

(56) References Cited

U.S. PATENT DOCUMENTS

| | | | |
|---|---|---|---|
| 9,154,167 B1* | 10/2015 | Lee | H03F 3/19 |
| 9,379,436 B1* | 6/2016 | Yu | H01Q 3/38 |
| 2004/0075495 A1* | 4/2004 | Wesselink | H03F 1/32 |
| | | | 330/132 |
| 2004/0145429 A1* | 7/2004 | Hieda | H03H 11/18 |
| | | | 333/164 |
| 2005/0285785 A1* | 12/2005 | Martin | H01Q 3/2611 |
| | | | 342/372 |
| 2009/0285151 A1* | 11/2009 | Eidenschink | H04B 7/18582 |
| | | | 370/316 |
| 2009/0309670 A1* | 12/2009 | Magrisso | H03H 11/20 |
| | | | 332/144 |
| 2011/0076952 A1* | 3/2011 | Chen | G06F 1/022 |
| | | | 455/42 |
| 2013/0207842 A1* | 8/2013 | Small | H01Q 3/005 |
| | | | 342/372 |
| 2014/0313073 A1* | 10/2014 | DiNallo | H01Q 3/34 |
| | | | 342/352 |
| 2015/0180109 A1* | 6/2015 | Kroening | H01P 1/397 |
| | | | 333/164 |
| 2015/0207486 A1* | 7/2015 | Ehyaie | H01Q 3/38 |
| | | | 375/257 |
| 2017/0170556 A1* | 6/2017 | Carey | H01Q 3/2611 |
| 2018/0011171 A1* | 1/2018 | McAleenan | G01R 31/2822 |

OTHER PUBLICATIONS

Hirokazu Kamoda et al., "Reduction in Quantization Lobes due to Digital Phase Shifters for Phased Array Radars", Microwave Conference Proceedings (APMC), 2011 Asia-Pacific , IEEE, Dec. 5, 2011 (Dec. 5, 2011), pp. 1618-1621.

International Search Report ad Written Opinion for PCTUS2017068812, dated Apr. 25, 2018 54 pages.

* cited by examiner

DIGITAL DITHERING FOR REDUCTION OF QUANTIZATION ERRORS AND SIDE-LOBE LEVELS IN PHASED ARRAY ANTENNAS

TECHNICAL FIELD

The present disclosure relates generally to phased array antennas. More particularly, some embodiments of the present disclosure are directed toward systems and methods for using digital dithering for reduction of quantization errors and side-lobe levels in phased array antennas.

BACKGROUND

Phased array antennas include multiple transmitting and/or receiving antenna elements that can be used together to form a directional radiation pattern. The relative phases or the respective signals feeding the antennas are controlled to create an effective radiation pattern that is strongest in a desired direction and suppressed in undesired directions. In this manner the antenna beam may be rapidly steered without any mechanical steering of the antenna (e.g., using a gimbal).

When quantized phase shifters are used to control the phases of the signals feeding the antenna elements, quantization errors result from the finite number of digitalization bits available to represent a signal phase. For example, in the case of a 2-bit phase shifter with four states, 0°, 90°, 180°, and 270°, the step size is 90° and the maximum quantization error is ±45°. When a radiating element requires a phase of 46°, the nearest state of this phase shifter is 90°, for which the error (between desired and actual) is 44°.

Quantization errors degrade antenna performance by increasing side lobe levels (SLL), i.e. the power density of side lobes that represent unwanted radiation in unwanted directions. Using a phase shifter with a greater number of quantization bits may improve antenna efficiency and lower SLLs, but it comes at the cost of a more expensive and complex phase shifter and control circuit.

SUMMARY

Systems and methods disclosed herein provide techniques for reducing quantization errors and side lobe levels in phased array antennas.

In one embodiment, a method includes: receiving an input signal at a quantized phase shifter of a phased array antenna; dithering the states of the quantized phase shifter to obtain a time averaged, phase shifted signal; and outputting the time averaged, phase shifted signal to an antenna element circuit of the phased array antenna. In some implementations the quantized phase shifter may be a 1-bit or 2-bit phase shifter. In one implementation, dithering the states of the quantized phase shifter comprises switching between the states of the quantized phase shifter at a rate greater than the highest symbol rate of an adjacent satellite. In a particular implementation, the states of the quantized phase shifter are switched at a rate at least four times greater than the highest symbol rate of an adjacent satellite.

In implementations, the states of the quantized phase shifter are dithered using linear interpolation or accumulator interpolation. In a particular implementation, dithering the states of the quantized phase shifter comprises: obtaining an error signal by comparing an output phase to a required phase; providing the error signal as an input to an integrator to obtain an integrated signal; unwrapping the output phase of the integrated signal to obtain an unwrapped signal; and quantizing the unwrapped signal.

The quantized phase shifter may provides a constant phase shift of an input signal over a frequency or the quantized phase shifter may provide a true time delay of an input signal.

In one embodiment, a phase array antenna includes: a plurality of quantized phase shifters; a controller configured to dither the states of each of the plurality of quantized phase shifters; and a plurality of antenna elements, where each of the plurality of antenna elements is configured to receive a time-averaged, phase shifted signal from a respective one of the plurality of quantized phase shifters. The phased array antenna may be a phased array antenna of a very small aperture terminal (VSAT). The phased array antenna may also be a phased array antenna of a satellite.

The techniques disclosed herein may be implemented in a phased array antenna receiver. In one embodiment, a method includes: receiving an RF communication signal at each of a plurality of antenna elements of a phased array antenna; outputting a signal from an antenna element to a quantized phase shifter; and dithering the states of the quantized phase shifter to obtain a time averaged, phase shifted signal. In this embodiment dithering the states of the quantized phase shifter may comprise switching between the states of the quantized phase shifter, and the states of the quantized phase shifter may be dithered using linear interpolation or accumulator interpolation. In an implementation, the method further comprises: amplifying the RF communication signal received at each of the plurality of antenna elements using a low noise amplifier.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As alluded to above, conventional phased array antennas that utilize quantized phase shifters rely on high bit phase shifters to minimize quantization errors. However, this increases the cost of the antenna in a number of areas: (1) the phase shifter devices themselves (costs approximately proportional to the number of bits), (2) the control circuitry, as its complexity increases with the number of phase shifting bits; (3) the transmission lines, typically waveguides or Printed Circuit Boards (PCB), as they become more complex with the number of phase shifting bits.

Embodiments of the systems and methods disclosed herein provide techniques for addressing the aforementioned problems by dithering the state of the quantized phase shifter to achieve a time-average value that significantly reduces quantization errors of the quantized phase shifter. By rapidly switching between the different states of the quantized phase shifter, a time-average value close to a desired phase state may be achieved even with a low resolution (e.g., 1-bit or 2-bit) phase shifter. This method may provide a number of advantages over conventional approaches of using phase shifters with higher bit-counts. First, this method reduces the quantization error and reduces antenna SLL, all at no additional hardware cost. Second, this method negates the requirement for calibration that is typical in phase shifter hardware implementations of any number of bits, but particularly high number of bits. This results in significant cost savings as calibration is quite time consuming, requires precision measurement instruments, and typically represents a significant percentage of system costs.

Figure 1:
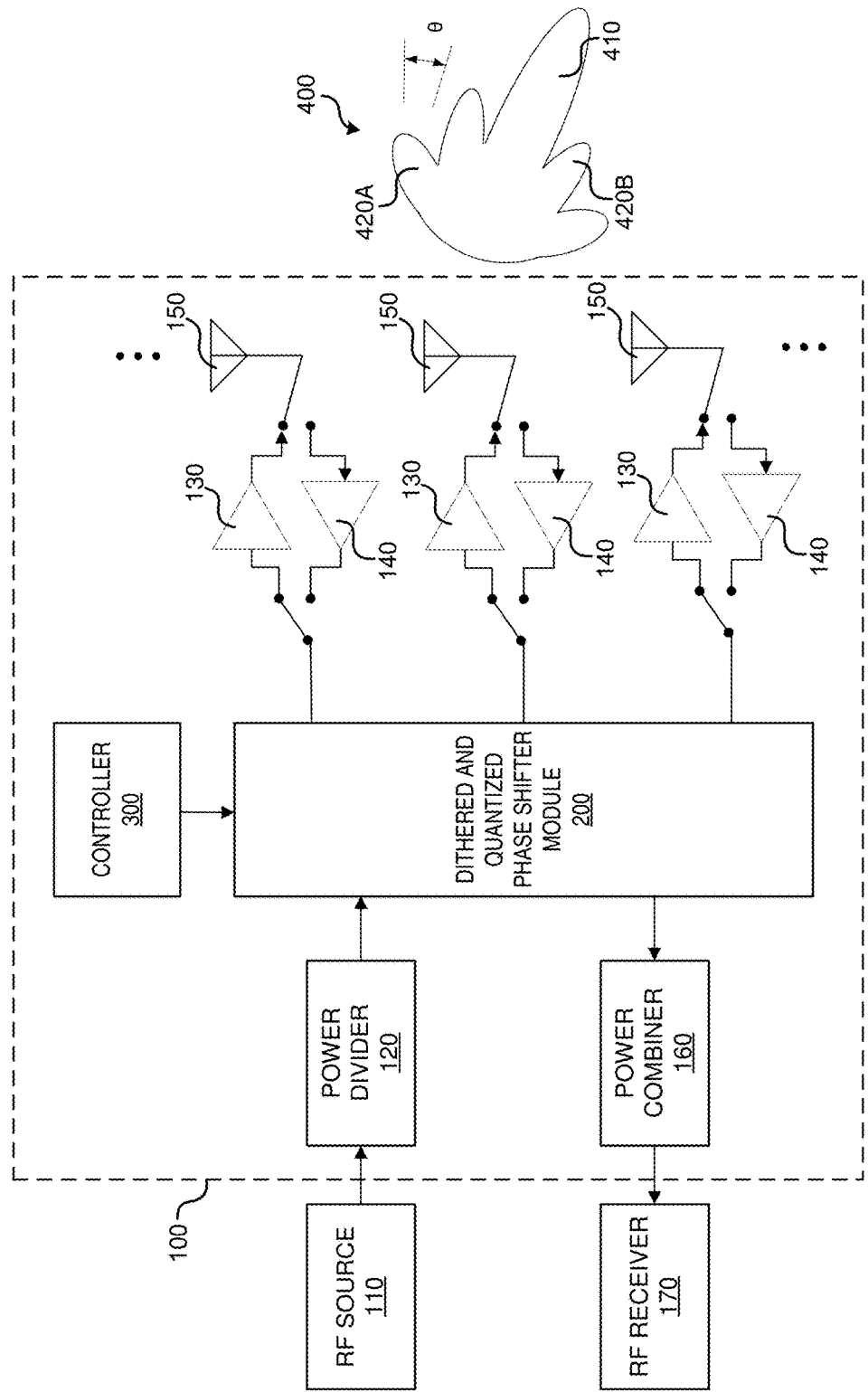
FIG. 1 is a block diagram illustrating an example bi-directional phased array antenna in which embodiments may be implemented.

FIG. 1 is a block diagram illustrating an example bi-directional phased array antenna 100, including antenna elements 150, in which embodiments may be implemented. Although a bi-directional phased array antenna 100 is shown in this example, the methods disclosed herein may implemented in unidirectional transmit phased array antennas. Phased array antenna may be implemented as a dynamic phased array antenna (i.e., each antenna element or group of elements may have an adjustable phase shifter), an active phased array antenna (i.e., each antenna element or group elements may have transmit amplification circuitry), a passive phased array antenna, or some variant thereof.

Phased array antenna 100 may be implemented in a variety of devices. For example, in one implementation phased array antenna 100 may be implemented in a fixed terminal (e.g., a VSAT terminal) communicating with a satellite. In such implementations, the technology disclosed herein may offer an affordable way of steering the antenna beam, automatically pointing the beam to the satellite, and periodically repointing the antenna beam to compensate for minor antenna movements due to ground settlement, ground freezing/thawing cycles, etc. In other implementations, phased array antenna 100 may be implemented in moving satellites (e.g., a low earth orbit satellite, a medium earth orbit satellite, etc.) and/or moving terminals that are on moving platforms (e.g., on a terrestrial vehicle or aircraft). In such implementations, the technology disclosed herein may provide an affordable way of fast beam tracking that constantly points the antenna beam towards the satellite.

As illustrated by FIG. 1, example phased array antenna 100 includes a power divider 120, transmit amplifiers 130, antenna elements 150, one or more low noise amplifiers 140, power combiner 160, dithered and quantized phase shifter module 200, and controller 300. It should be noted that one of ordinary skill in the art will understand how other transmit or receive configurations can be implemented in phased array antenna 100, and that certain components of phased array antenna 100 may be implemented in either digital form (e.g., as software running on a DSP or other processing device, with the addition of a DAC) or as analog components. Additionally, although the components of phased array antenna 100 are shown in a particular order in this example, one of ordinary skill in the art reading this description will understand that the order of components can be varied and some components may be excluded. For simplicity, a discussion of the receive operation of phased array antenna 100, and receive components such as LNAs 140, power combiner 160, and receiver 170 will be omitted. However, one having skill in the art will appreciate how such components may implement the reverse operation of the transmit components described herein.

During transmit operation, illustrated by FIG. 1, phased array antenna 100 may steer an antenna beam 400 in a direction by varying the phases of radiating antenna elements 150 so as to produce an effective radiation pattern (as determined by constructive and destructive interference of the signals emitted by each antenna element 150) in a desired direction (azimuthal and/or elevation). For example, the phase of every radiating antenna element 150 may be varied such that there is progressive phase along the rows and/or columns of the radiating elements. As further described below, this may be implemented by using a phase shifter (for every radiating element or group of elements) that can vary the phase of the RF energy radiated by the respective element. As illustrated in this example, a beam 400 is steered at an angle θ relative to elements 150 and includes a main lobe 410 and side lobes 420A-420B.

With specific reference to the elements of phased array antenna 100 during a transmit operation, phased array antenna 100 receives an RF signal from an RF source 110. For example, RF source 110 may take a bit source as an input and perform functions such as signal encoding, interleaving, modulation, and filtering. Signals coming from RF source 110 may be based, for example, on the DVB-S2 standard (ETSI EN 302 307) using signal constellations up to and including at least 32-APSK, or on the Internet Protocol over Satellite (IPoS) standard (ETSI TS 102 354), or on other standard or proprietary specifications incorporating adaptive coding and modulation. Other suitable signal types may also be used, including, for example higher data rate variations of DVB-S2, or DVB-S2 extensions or adaptations sometimes designated as DVB-S2X.

Additionally, RF source 110 may modulate an information signal onto a suitable carrier (e.g., an RF carrier signal)

at a desired frequency. For example, phased array antenna 100 may operate in the Ka-band, Ku-band, C-band or other suitable band. However, it should be noted that the up conversion or modulation of the signal onto a suitable carrier may be performed before or after the phase delay.

Power divider 120 may couple a defined amount of power of a signal provided by RF source 110 to a plurality of signal paths, each of the divided signals being fed along a path to an antenna element 150. For instance, in implementations where each antenna element 150 includes a respective phase shifter, power divider 120 may feed a respective instance of a signal to the phase shifter, which is phase shifted at a quantized phase shifter of module 200, amplified by amplifier 130 and transmitted by an antenna element 150.

Figure 2:
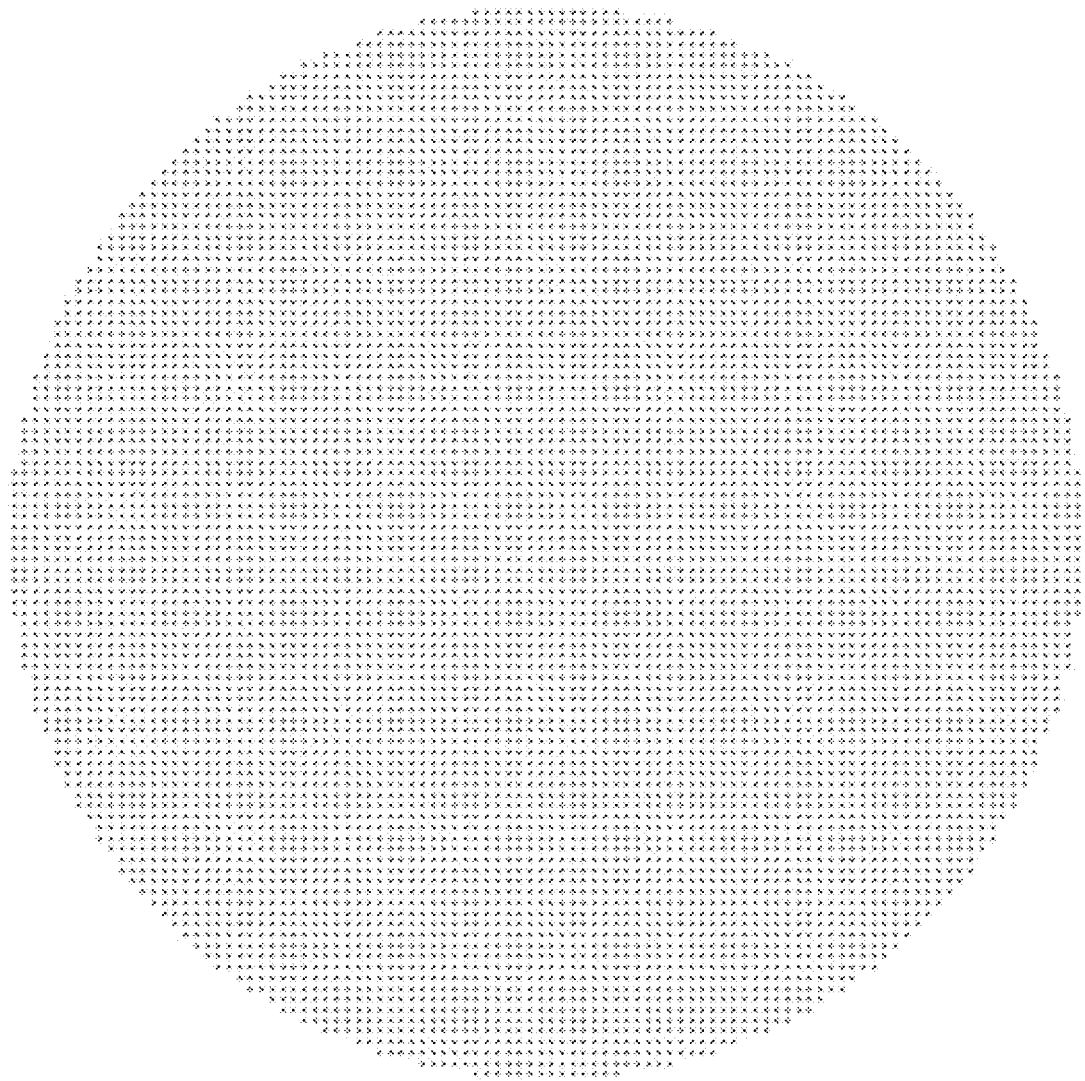
FIG. 2 illustrates one particular implementation of a phased array antenna whereby elements are arranged in a circular array and are spaced apart in half wavelengths.

Depending on the implementation, antenna elements 150 may be arranged in a variety of configurations. For example, antenna elements 150 may be linearly arranged in a linear array, in a rectangular array, a circular array, or some other suitable arrangement. Within the arrangement, antenna elements 150 may be spaced apart depending on the wavelength of the transmitted waveform. For example, elements 150 may be spaced apart in half wavelengths or quarter wavelengths. The number of antenna elements 150 may depend on the gain requirements of phased array antenna 100 and the type of radiator used for each antenna element. For example, a 20 dB gain antenna may require about 100 elements or more, a 30 dB gain antenna may require about 1000 elements or more, and a 40 dB antenna may require about 10,000 elements or more, and so forth. FIG. 2 illustrates one particular implementation of a phased array antenna whereby elements 150 are arranged in a circular array and are spaced apart in half wavelengths.

Dithered and quantized phase shifter module 200, may include a quantized phase shifter for each element 150 or group of elements 150 that changes the transmission phase angle or true time delay of a signal transmitted by a respective element 150. Each quantized phase shifter is digitally controlled using one or more bits (e.g., 1 bit, 2 bits, 3 bits, etc.), which provide a discrete set of states that are controlled using a controller 300. For example, as discussed above, a two bit phase shifter may have four states: 0°, 90°, 180°, and 270°. As another example, a three bit phase shifter may include eight states: 0°, 45°, 90°, 135°, 180°, 225°, 270°, and 315°. In some implementations, the quantized phase shifters may provide a true time delay as opposed to a constant phase shift over a frequency. For ease of discussion, as used herein, the term "quantized phase shifter" refers to either a phase shifter that provides a constant phase shift over a frequency or a true time delay. Similarly, the term "n-bit phase shifter" may refer to either variety of phase shifter that can be controlled using n digital bits.

During operation, further described below, controller 300 may cause each quantized phase shifter to rapidly switch between each of its states (e.g., using pulse width modulation), thereby effectively dithering the output of the phase shifter and reducing quantization error. For example, consider the case of a 2-bit phase shifter (including states 0° and 90°) and desired phase angle of 22.5 for an antenna element 150. By rapidly switching between the 0° and 90° states with a 75% duty cycle in the 0° state and a 25% duty cycle in the 90° state (e.g., three 0° states for every one 90° state), the time-averaged value of the state of the quantized phase shifter is 22.5°, thereby effectively reducing the quantization error to 0° and providing the same resolution as a 4-bit phase shifter. This in turn may reduce side lobe degradation of the directional beam transmitted by the phased array antenna. As another example, consider the case of a 2-bit phase shifter (including states of 1 µs and 2 µs) and desired true time delay of 1.5 µs for an antenna element 150. By rapidly switching between the 1 µs and 2 µs states at the same duty cycle, the time-averaged value of the state of the quantized phase shifter is 1.5 µs.

Figure 3:
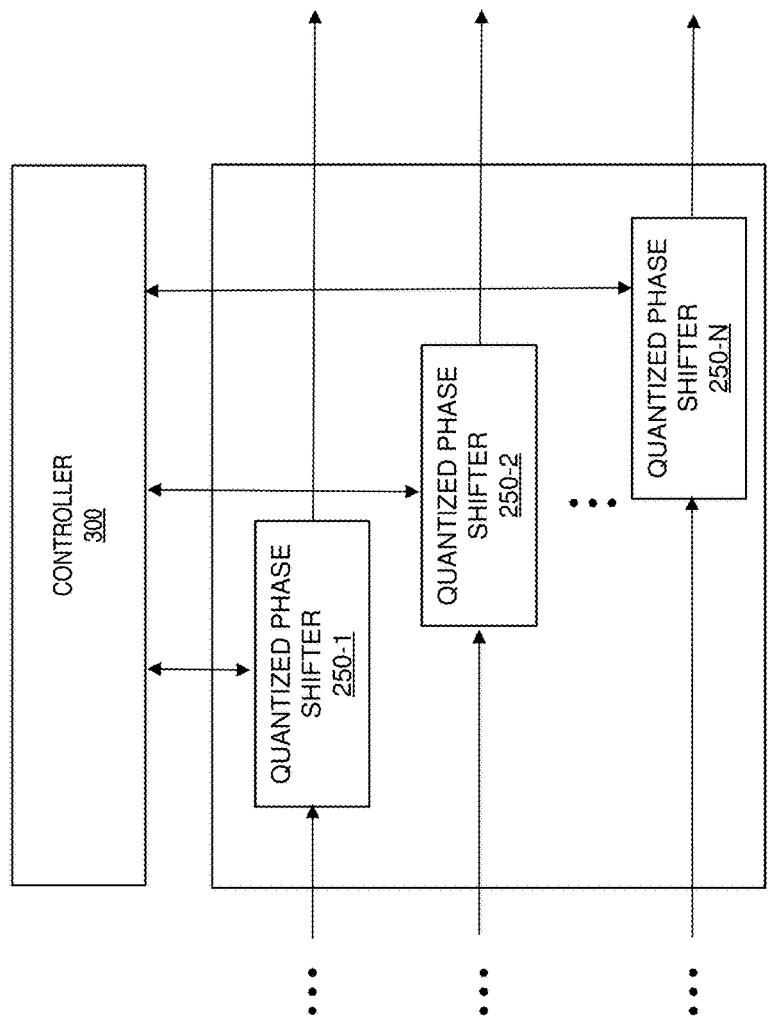
FIG. 3 is a block diagram illustrating an example implementation in which controller dithers quantized phase shifters of a phased array antenna.
Figure 4:
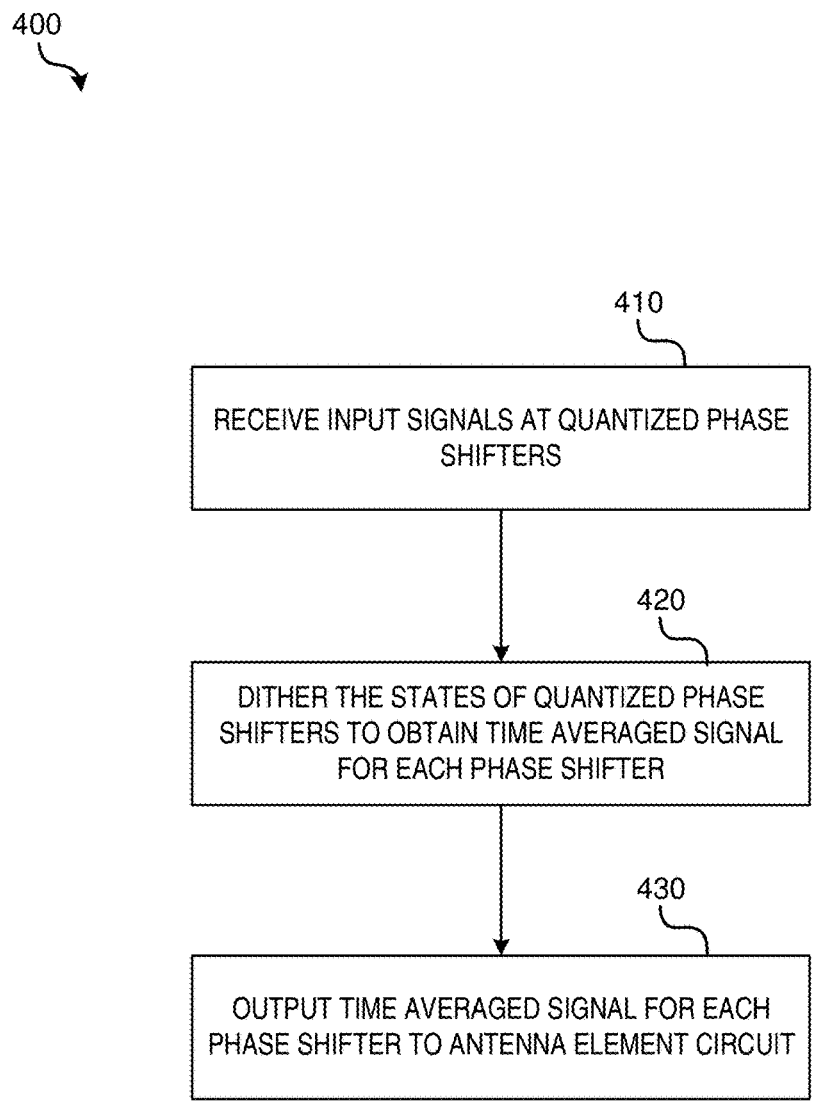
FIG. 4 is a flow diagram illustrating an example method of dithering the states of quantized phase shifters in a phased array antenna to reduce quantization errors and side lobe levels in the phased array antenna.

FIG. 3 is a block diagram illustrating an example implementation in which controller 300 dithers quantized phase shifters 250-1 to 250-N of a phased array antenna. In this example, controller 300 may cause phase shifters 250-1 to 250-N to rapidly cycle between their states based on a desired phase shift. FIG. 3 will be described in conjunction with FIG. 4, which is a flow diagram illustrating an example method 400 of dithering the states of quantized phase shifters in a phased array antenna to reduce quantization errors and side lobe levels in the phased array antenna.

At operation 410, input signals are received at quantized phase shifters 250-1 to 250-N. For example, individual instances of the same RF signal may be delivered to a respective quantized phase shifter 250-1 configured to generate a respective phase delay.

At operation 420, the states of each quantized phase shifter 250-1 to 250-N is dithered using controller 300 to generate a time-averaged phase shifted signal. In various implementations, the state of each quantized phase shifter may be dithered by switching or cycling between the states of the quantized phase shifter at a frequency greater than the highest symbol rate of an adjacent satellite. In particular implementations, switching may occur at a frequency of at least four times the highest symbol rate of the adjacent satellite. For example, if an adjacent Ku satellite operates using 40 MHz transponders, switching may occur at a rate of 160 MHz or greater. At operation 430, the phase shifted signals are output to respective antenna element circuits.

Digital dithering of a phase shifter's state may be implemented using a variety of algorithms that cycle through the phase shifter states given a desired phase shift. For example, linear interpolation, the use of accumulator interpolation, or other types of algorithms may be implemented. During each cycle, the quantized phase may be used to create a power radiation pattern using a signal with a bandwidth that is much higher than that of the neighboring satellite. A group of patterns, which are produced from individual cycles, may then be averaged to produce a compliant radiation pattern. In implementations, the number of cycles may be chosen such that the side lobes produced by the phased array antenna are sufficiently suppressed to a given level (e.g., in dBi).

In implementations, controller 300 may be embedded in a chip that has a plurality of switches for controlling the states of quantized phase shifters 250-1 to 250-N. For example, controller 300 may be implemented as a complimentary metal-oxide-semiconductor (CMOS) controller on a chip comprising silicon-germanium switches. In implementations, a chip including the quantized phase shifters, may be embedded with an algorithm that may be used to dither the states of the quantized phase shifters.

Figure 5:
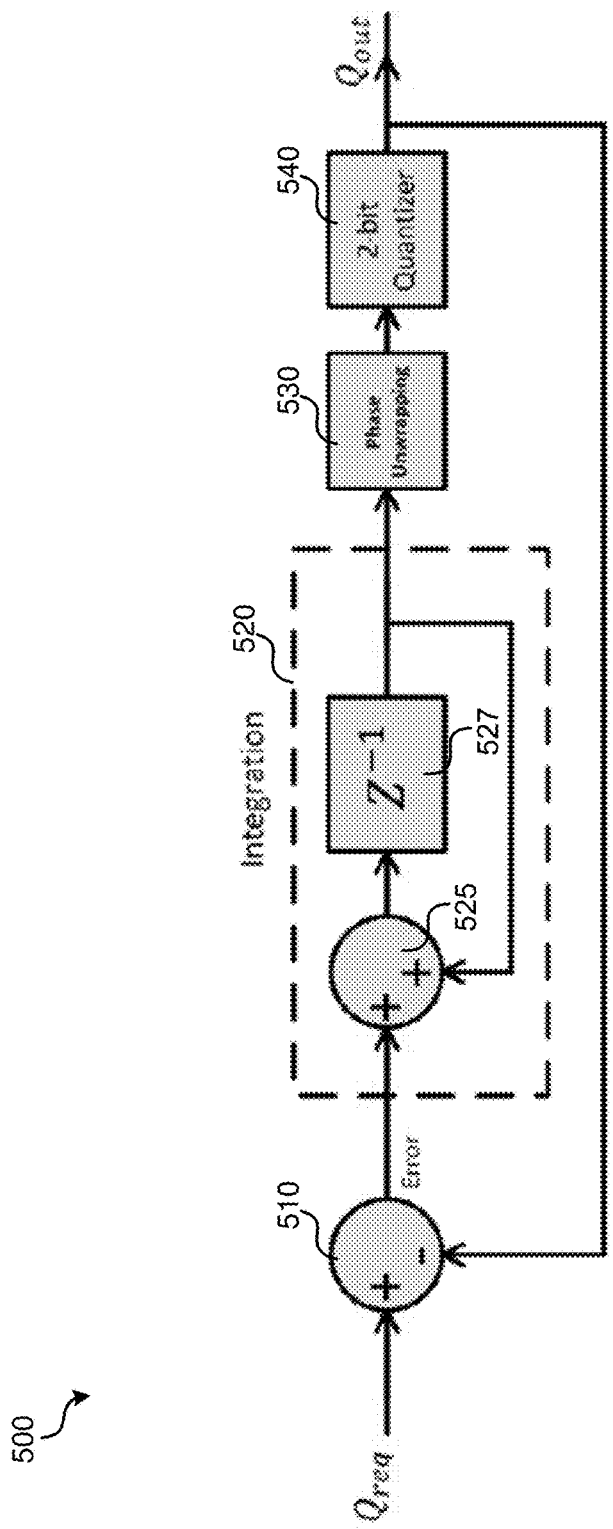
FIG. 5 is a diagram illustrating an example digital dithering algorithm that may be applied to a 2-bit phase shifter in accordance with embodiments.

FIG. 5 is a block diagram illustrating an example digital dithering algorithm that may be applied to a 2-bit phase shifter in accordance with embodiments. As illustrated, the algorithm includes a subtractor 510, an integrator 520 including an adder 525 and digital sample delay module 527, a phase unwrapping module 530, and a quantizer 540 (2-bits in this example).

As illustrated by FIG. 5, the output phase $Q_{out}$ that is a result of quantization with a limited number of bits (2 bits in this example) is compared to a required phase $Q_{req}$ that is exact. An error is produced as a result of this comparison. This error is then provided as an input to integrator 520. The output phase is unwrapped using unwrapping module 530 to fall within the range of the quantized phase, that is [0°, 360°). The output is then quantized by quantizer 540 based on the number of bits specified by the quantizer.

The loop cycle shown in FIG. 5 may be performed multiple times (e.g., two times, four times, ten times, etc.) and the radiated power of all the cycles is averaged to produce a dithered power radiation pattern. In implementations, the signals transmitted over individual cycles are transmitted over a bandwidth that is much wider (e.g., at least four times) than the measurable bandwidth of the neighboring satellite. The resultant averaged, or dithered, power radiation pattern may be compliant with FCC 25.209.

Figure 6A:
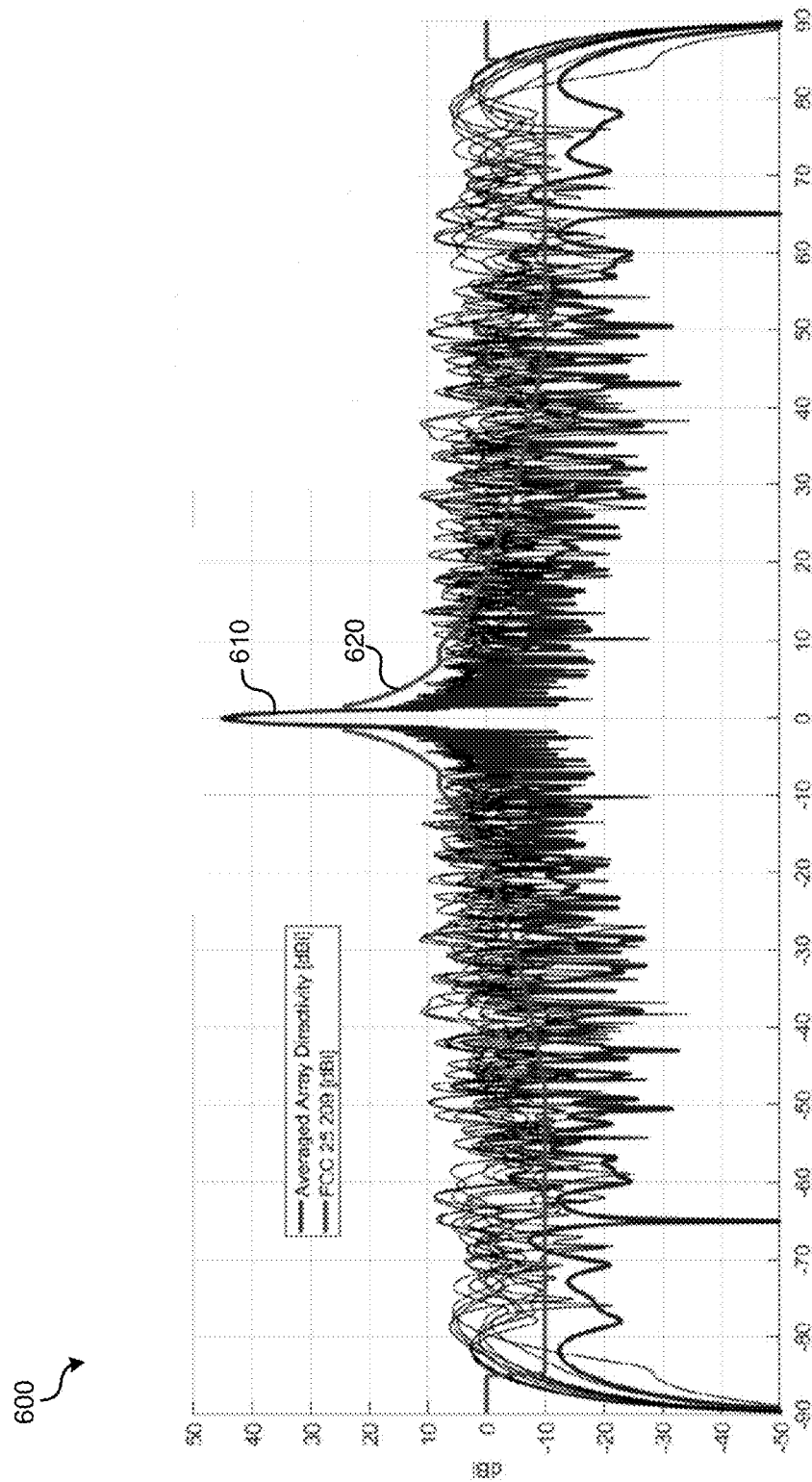
FIG. 6A depicts experimental results illustrating the time-averaged directivity pattern of a beam transmitted at 30 GHz using a phased array antenna that dithers 2-bit phase shifters.
Figure 6B:
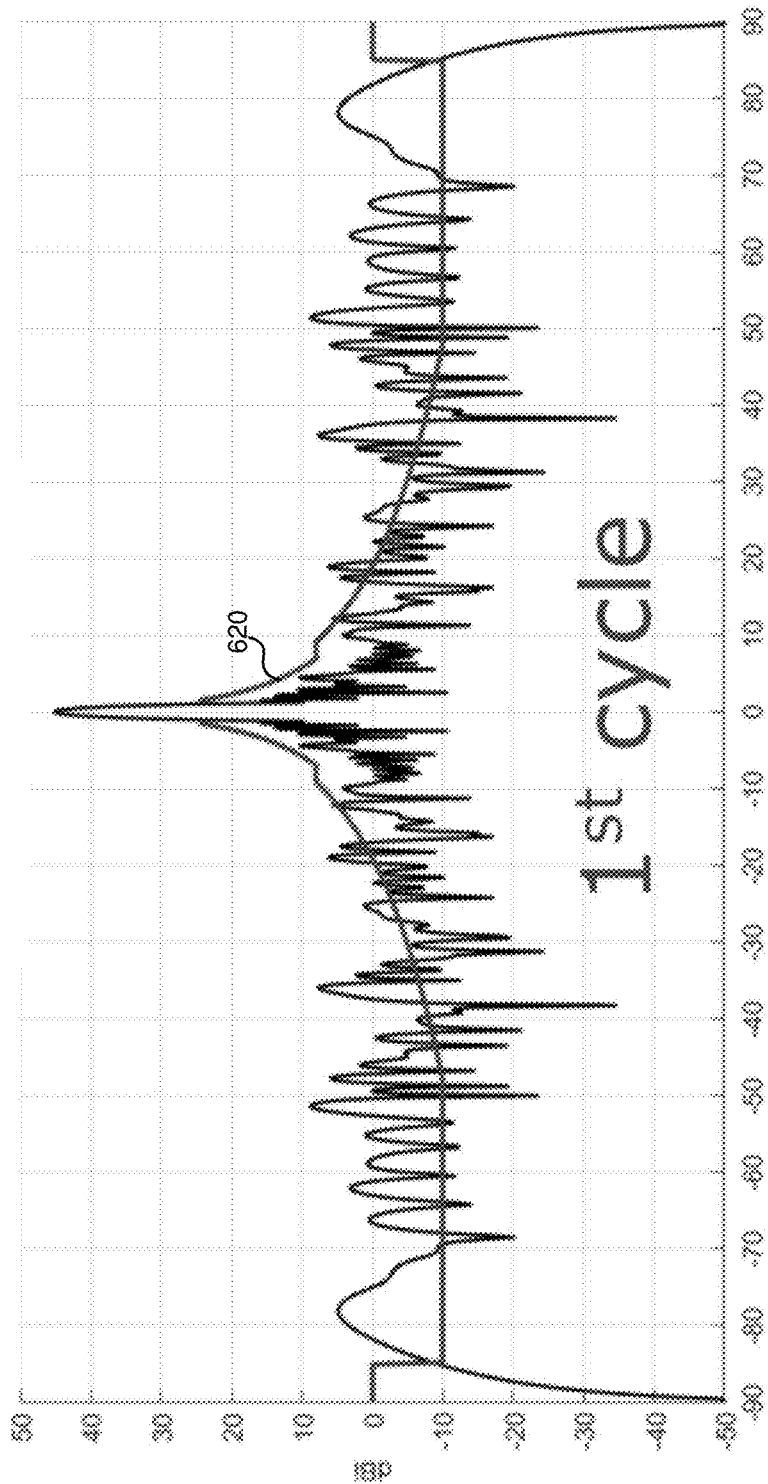
FIGS. 6B depicts experimental results illustrating the time-averaged directivity pattern of a beam transmitted at 30 GHz using a phased array antenna that does not dither.

FIG. 6A shows experimental results illustrating the time-averaged directivity pattern (i.e., antenna gain in dBi as a function of scan angle) of a beam transmitted at 30 GHz using a phased array antenna that dithers 2-bit phase shifters. In the examples of FIG. 6A, the 2-bit phase shifters were dithered using the digital dithering algorithm illustrated in FIG. 5. FIG. 6B illustrates the directivity pattern when there is no dithering (one clock cycle). FIG. 6A illustrates the directivity pattern when there is dithering for ten clock cycles. The averaged array directivity pattern 610 after ten cycles has substantially reduced side lobes and is on par with earth station antenna performance standards as prescribed by FCC Rule 25.209. The max average directivity power in the main lobe (scan angle of 0°) is over 44 dBi.

Figure 7:
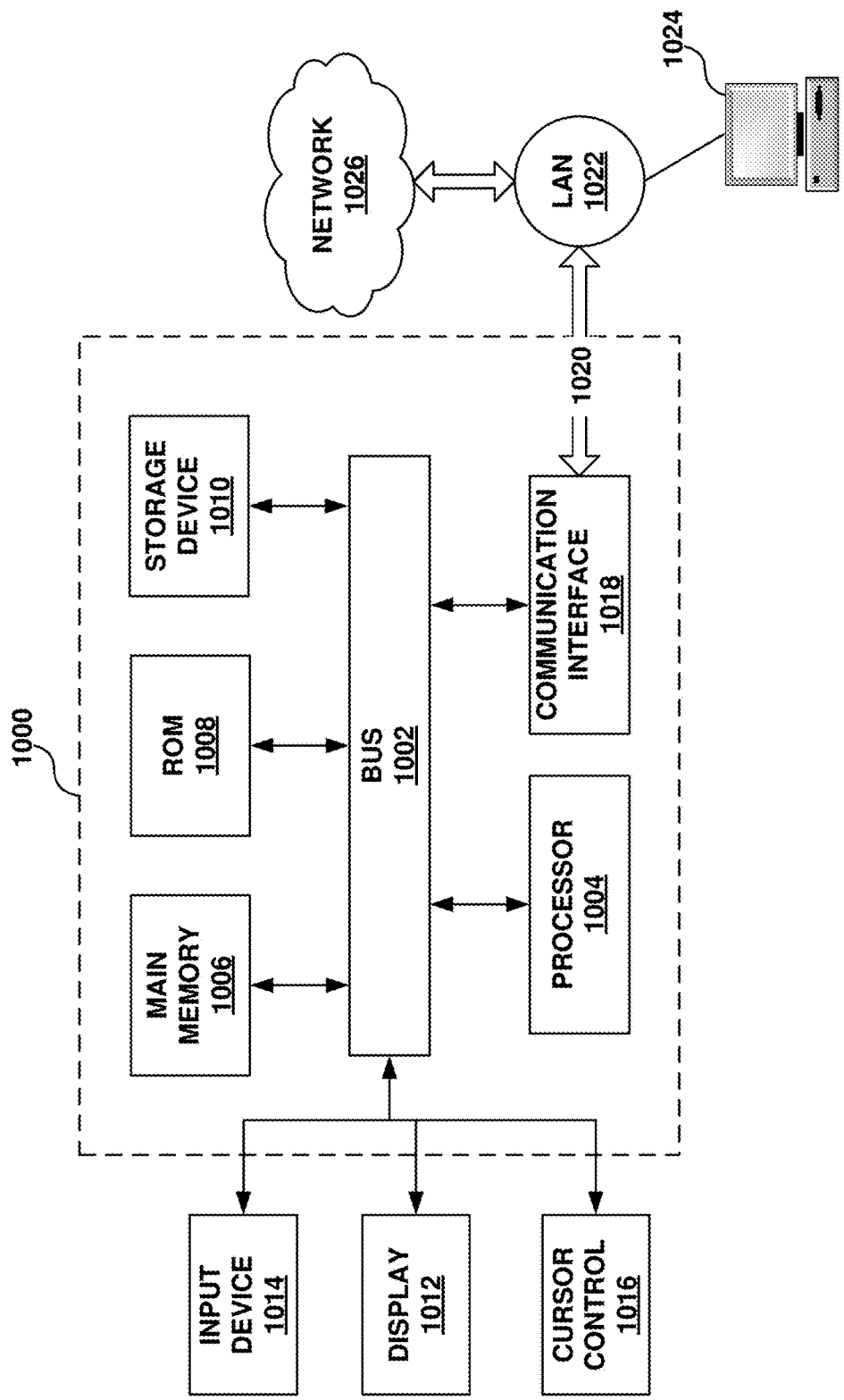
FIG. 7 illustrates an example computing module that may be used in implementing features of various embodiments.

FIG. 7 illustrates a computer system 1000 upon which example embodiments according to the present disclosure can be implemented. Computer system 1000 can include a bus 1002 or other communication mechanism for communicating information, and a processor 1004 coupled to bus 1002 for processing information. Computer system 1000 may also include main memory 1006, such as a random access memory (RAM) or other dynamic storage device, coupled to bus 1002 for storing information and instructions to be executed by processor 1004. Main memory 1006 can also be used for storing temporary variables or other intermediate information during execution of instructions to be executed by processor 1004. Computer system 1000 may further include a read only memory (ROM) 1008 or other static storage device coupled to bus 1002 for storing static information and instructions for processor 1004. A storage device 1010, such as a magnetic disk or optical disk, may additionally be coupled to bus 1002 for storing information and instructions.

Computer system 1000 can be coupled via bus 1002 to a display 1012, such as a cathode ray tube (CRT), liquid crystal display (LCD), active matrix display, light emitting diode (LED)/organic LED (OLED) display, digital light processing (DLP) display, or plasma display, for displaying information to a computer user. An input device 1014, such as a keyboard including alphanumeric and other keys, may be coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012.

According to one embodiment of the disclosure, dithering of the quantized phase shifter, in accordance with example embodiments, is provided by computer system 1000 in response to processor 1004 executing an arrangement of instructions contained in main memory 1006. Such instructions can be read into main memory 1006 from another computer-readable medium, such as storage device 1010. Execution of the arrangement of instructions contained in main memory 1006 causes processor 1004 to perform one or more processes described herein. One or more processors in a multi-processing arrangement may also be employed to execute the instructions contained in main memory 1006. In alternative embodiments, hard-wired circuitry is used in place of or in combination with software instructions to implement various embodiments. Thus, embodiments described in the present disclosure are not limited to any specific combination of hardware circuitry and software.

Computer system 1000 may also include a communication interface 1018 coupled to bus 1002. Communication interface 1018 can provide a two-way data communication coupling to a network link 1020 connected to a local network 1022. By way of example, communication interface 1018 may be a digital subscriber line (DSL) card or modem, an integrated services digital network (ISDN) card, a cable modem, or a telephone modem to provide a data communication connection to a corresponding type of telephone line. As another example, communication interface 1018 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1018 sends and receives electrical, electromagnetic, or optical signals that carry digital data streams representing various types of information. Further, communication interface 1018 may include peripheral interface devices, such as a Universal Serial Bus (USB) interface, a PCMCIA (Personal Computer Memory Card International Association) interface, etc.

Network link 1020 typically provides data communication through one or more networks to other data devices. By way of example, network link 1020 can provide a connection through local network 1022 to a host computer 1024, which has connectivity to a network 1026 (e.g. a wide area network (WAN) or the global packet data communication network now commonly referred to as the "Internet") or to data equipment operated by service provider. Local network 1022 and network 1026 may both use electrical, electromagnetic, or optical signals to convey information and instructions. The signals through the various networks and the signals on network link 1020 and through communication interface 1018, which communicate digital data with computer system 1000, are example forms of carrier waves bearing the information and instructions.

Computer system 1000 may send messages and receive data, including program code, through the network(s), network link 1020, and communication interface 1018. In the Internet example, a server (not shown) might transmit requested code belonging to an application program for implementing an embodiment of the present disclosure through network 1026, local network 1022 and communication interface 1018. Processor 1004 executes the transmitted code while being received and/or store the code in storage device 1010, or other non-volatile storage for later execution. In this manner, computer system 1000 obtains application code in the form of a carrier wave.

The term "computer-readable medium" as used herein refers to any medium that participates in providing instructions to processor 1004 for execution. Such a medium may take many forms, including but not limited to non-volatile media, volatile media, and transmission media. Non-volatile media include, for example, optical or magnetic disks, such as storage device 1010. Volatile media may include dynamic memory, such as main memory 1006. Transmission media may include coaxial cables, copper wire and fiber optics, including the wires that comprise bus 1002. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present disclosure may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 8:
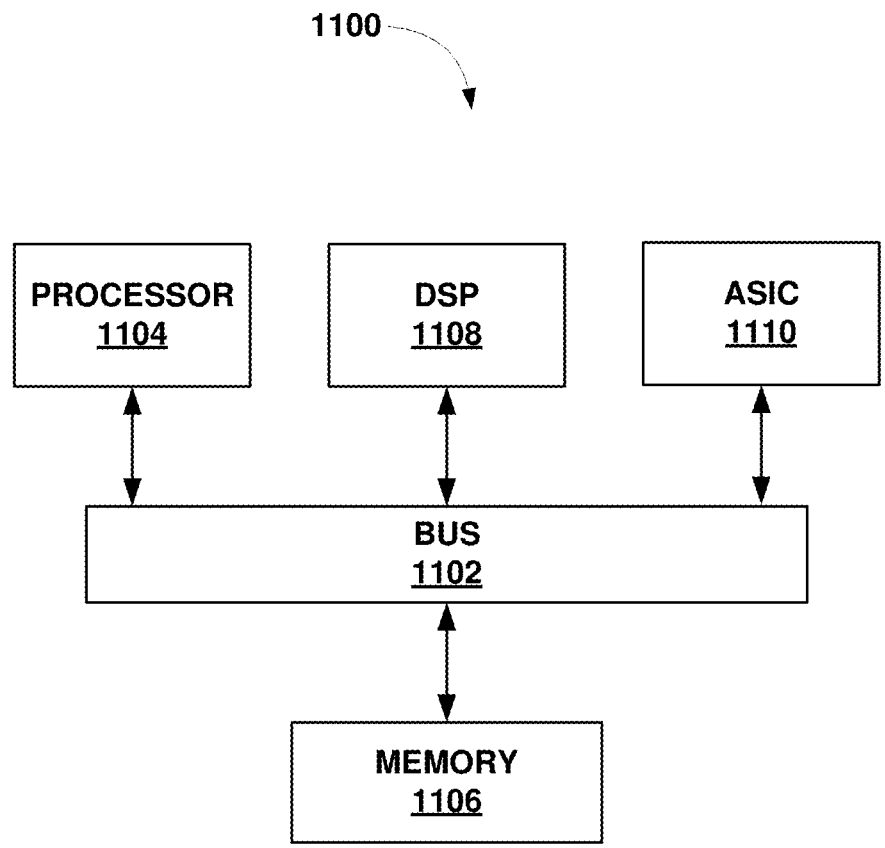
FIG. 8 illustrates an example chip set that can be utilized in implementing architectures and methods for digital dithering for reduction of quantization errors and side-lobe levels in phased array antennas in accordance with various embodiments.

FIG. 8 illustrates a chip set 1100 in which embodiments of the disclosure may be implemented. Chip set 1100 can include, for instance, processor and memory components described with respect to FIG. 8 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1100 includes a communication mechanism such as a bus 1002 for passing information among the components of the chip set 1100. A processor 1104 has connectivity to bus 1102 to execute instructions and process information stored in a memory 1106. Processor 1104 includes one or more processing cores with each core configured to perform independently. A multi-core processor enables multiprocessing within a single physical package. Examples of a multi-core processor include two, four, eight, or greater numbers of processing cores. Alternatively or in addition, processor 1104 includes one or more microprocessors configured in tandem via bus 1102 to enable independent execution of instructions, pipelining, and multithreading. Processor 1004 may also be accompanied with one or more specialized components to perform certain processing functions and tasks such as one or more digital signal processors (DSP) 1108, and/or one or more application-specific integrated circuits (ASIC) 1110. DSP 1108 can typically be configured to process real-world signals (e.g., sound) in real time independently of processor 1104. Similarly, ASIC 1110 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1104 and accompanying components have connectivity to the memory 1106 via bus 1102. Memory 1106 includes both dynamic memory (e.g., RAM) and static memory (e.g., ROM) for storing executable instructions that, when executed by processor 1104, DSP 1108, and/or ASIC 1110, perform the process of example embodiments as described herein. Memory 1106 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 1000. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration

What is claimed is:

1. A method, comprising:
receiving an input signal at a quantized phase shifter of a phased array antenna;
obtaining a time averaged, phased shifted signal that reduces a quantization error of the phase shifter, wherein obtaining the time averaged phase shifted signal comprises switching between two phase states of the quantized phase shifter a plurality of times to obtain a time-averaged value of a state of the quantized phase shifter that is between values of the two phase states; and
outputting the time averaged, phase shifted signal to an antenna element circuit of the phased array antenna.

2. The method of claim 1, wherein switching between the two phase states of the quantized phase shifter comprises switching between the two phase states of the quantized phase shifter at a rate greater than the highest symbol rate of an adjacent satellite.

3. The method of claim 2, wherein switching between the two phase states of the quantized phase shifter comprises switching between the two phase states of the quantized phase shifter at a rate at least four times greater than the highest symbol rate of an adjacent satellite.

4. The method of claim 1, wherein the time averaged, phase shifted signal is obtained using at least linear interpolation or accumulator interpolation.

5. The method of claim 1, wherein obtaining the time averaged, phase shifted signal comprises:
obtaining an error signal by comparing an output phase to a required phase; and
providing the error signal as an input to an integrator to obtain an integrated signal.

6. The method of claim 5, wherein obtaining the time averaged, phase shifted signal comprises:
unwrapping the output phase of the integrated signal to obtain an unwrapped signal; and
quantizing the unwrapped signal.

7. The method of claim 1, wherein the quantized phase shifter is 1-bit or 2-bit phase shifter.

8. The method of claim 1, wherein the quantized phase shifter provides a constant phase shift of an input signal over a frequency.

9. The method of claim 1, wherein the quantized phase shifter provides a true time delay of an input signal.

10. The method of claim 1, wherein switching between the two phase states of the quantized phase shifter a plurality of times to obtain a time-averaged value of a state of the quantized phase shifter that is between values of the two phase states, comprises: using pulse width modulation duty cycles corresponding to the two phase states to obtain the time-averaged value.

11. A phased array antenna, comprising:
a plurality of quantized phase shifters;
a controller to switch between the phase states of each of the plurality of quantized phase shifters to obtain a time-averaged, phase shifted signal from each of the plurality of quantized phase shifters, wherein the controller is configured to obtain the time-averaged, phase shifted signal for each of the plurality of quantized phase shifters by switching between two phase states of the quantized phase shifter a plurality of times to obtain a time-averaged value of a state of the quantized phase shifter that is between values of the two phase states; and
a plurality of antenna elements, wherein each of the plurality of antenna elements is to receive the time-averaged, phase shifted signal from a respective one of the plurality of quantized phase shifters.

12. The phased array antenna of claim 11, wherein each of the plurality of quantized phase shifters is 1-bit or 2-bit phase shifter.

13. The phased array antenna of claim 11, wherein each of the plurality of quantized phase shifters provides a constant phase shift of an input signal over a frequency.

14. The phased array antenna of claim 11, wherein each of the plurality of quantized phase shifters provides a true time delay of an input signal.

15. The phased array antenna of claim 11, wherein the phased array antenna is a phased array antenna of a very small aperture terminal (VSAT).

16. The phased array antenna of claim 11, wherein the phased array antenna is a phased array antenna of a satellite.

17. The phased array antenna of claim 11, wherein the controller is to obtain the time-averaged, phase shifted signal of each of the plurality of quantized phase shifters using at least linear interpolation or accumulator interpolation.

18. A method, comprising:
receiving an RF communication signal at each of a plurality of antenna elements of a phased array antenna;
outputting a signal from an antenna element to a quantized phase shifter; and
obtaining a time averaged, phased shifted signal that reduces a quantization error of the phase shifter, wherein obtaining the time averaged phase shifted signal comprises switching between two phase states of the quantized phase shifter a plurality of times to obtain a time-averaged value of a state of the quantized phase shifter that is between values of the two phase states.

19. The method of claim 18, wherein obtaining the time averaged, phased shifted signal comprises: obtaining an error signal by comparing an output phase to a required phase; and providing the error signal as an input to an integrator to obtain an integrated signal.

20. The method of claim 18, wherein the time averaged, phase shifted signal is obtained using linear interpolation or accumulator interpolation.

21. The method of claim 18, further comprising: amplifying the RF communication signal received at each of the plurality of antenna elements using a low noise amplifier.

\* \* \* \* \*